United States Patent
Ito et al.

(10) Patent No.: US 6,562,092 B1
(45) Date of Patent: May 13, 2003

(54) CERIUM BASED ABRASIVE MATERIAL, RAW MATERIAL THEREOF AND METHOD FOR THEIR PREPARATION

(75) Inventors: Terunori Ito, Tokyo (JP); Hidehiko Yamasaki, Tokyo (JP); Yoshitsugu Uchino, Tokyo (JP)

(73) Assignee: Mitsui Mining & Smelting Co., Ltd., Tokyo (JP)

(*) Notice: Subject to any disclaimer, the term of this patent is extended or adjusted under 35 U.S.C. 154(b) by 0 days.

(21) Appl. No.: 09/980,123

(22) PCT Filed: Apr. 6, 2001

(86) PCT No.: PCT/JP01/02988

§ 371 (c)(1),
(2), (4) Date: Nov. 30, 2001

(87) PCT Pub. No.: WO01/88056

PCT Pub. Date: Nov. 22, 2001

(30) Foreign Application Priority Data

| May 16, 2000 | (JP) | ......................................... 2000-143005 |
| Jul. 24, 2000 | (JP) | ......................................... 2000-222802 |
| Dec. 11, 2000 | (JP) | ......................................... 2000-375535 |
| Dec. 11, 2000 | (JP) | ......................................... 2000-375536 |

(51) Int. Cl.$^7$ ............................. C09K 3/14; C01F 17/00
(52) U.S. Cl. ............................. 51/309; 51/307; 423/263
(58) Field of Search ..................... 51/309, 307; 423/263

(56) References Cited

U.S. PATENT DOCUMENTS 4,049,463 A * 9/1977 Hafner ........................ 106/401
4,769,073 A * 9/1988 Tastu et al. .................... 106/3

FOREIGN PATENT DOCUMENTS

JP           8-134435 A        5/1996

* cited by examiner

Primary Examiner—Michael Marcheschi
(74) Attorney, Agent, or Firm—Rothwell, Figg, Ernst & Manbeck

(57) ABSTRACT

The present invention provides a stock material for cerium-based abrasives which can be sintered at a relatively low roasting temperature without causing abnormal growth of the particles. More concretely, the stock material for cerium-based abrasives is produced by calcinating the carbonate of rare earth at a given temperature level to partly convert it into the oxide of rare earth in such a way to produce the mixed stock material having a loss on ignition of 0.5 to 25% on a dry basis, determined by heating at 1000° C. for 1 hour.

24 Claims, 3 Drawing Sheets

CERIUM BASED ABRASIVE MATERIAL, RAW MATERIAL THEREOF AND METHOD FOR THEIR PREPARATION

FIELD OF THE INVENTION

This invention relates to a method of producing a stock material for cerium-based abrasives comprising cerium oxide as the main ingredient, and also to a cerium-based abrasive of excellent grinding characteristics, produced from the above stock material.

EARLIER TECHNOLOGY

Cerium-based abrasives have been used for grinding various glass materials. Recently, in particular, their applicable areas have been expanding, as they are used for grinding glass materials for electric and electronic devices, e.g., glass as magnetic recording medium for hard disks or the like and glass substrates for liquid crystal displays.

A cerium-based abrasive is composed of cerium oxide ($CeO_2$) particles as the main ingredient and abrasive particles of another rare-earth metal oxide. It is classified into two general categories, high-cerium and low-cerium, by a proportion of a cerium oxide content to a total rare-earth oxide (hereinafter referred to as TREO) content. The methods of producing these types are not much different. More concretely, the method starts with crushing the stock material followed by chemical treatment (wet treatment) for each type. The chemical treatment methods include fluorination, i.e., incorporation of a fluorine component to secure high grindability for the cerium-based abrasive, and treatment with a mineral acid to remove an alkaline metal, e.g., sodium, for prevention of abnormal growth of the particles during a roasting process. The wet-treated stock material is subjected to filtration, drying, roasting at high temperature to sinter the stock particles with each other, crushing again and classification, to produce an abrasive of desired particle size and particle size distribution.

The stock material for cerium-based abrasives has been frequently concentrated bastnaesite, a naturally occurring mineral substance obtained by beneficiation of the rare-earth ore by the name of bastnaesite. More recently, the abrasives are produced more frequently from carbonate of cerium-group rare-earth (hereinafter sometimes referred to as the carbonate of rare-earth) or oxide of cerium-group rare-earth (hereinafter sometimes referred to as the oxide of rare-earth). The carbonate of rare-earth is a chemically treated bastnaesite ore or chemically treated relatively-cheap China's complex ore, which an increased rare-earth metal content, and the oxide of rare-earth is obtained through roasting the carbonate of rare-earth.

The cerium-based abrasive produced from the carbonate of rare-earth as the stock material may sometimes have insufficient grindability. On the other hand, it is pointed out that the cerium-based abrasive produced from the oxide of rare-earth as the stock material tends to leave behind fine scratches on the ground surface, although excellent in grindability.

SUMMARY OF THE INVENTION

The present invention is developed to solve the above problems. It is an object of the present invention to provide a cerium-based abrasive having sufficient grindability and, at the same time, little leaving behind fine scratches on a ground surface. It is another object of the present invention to provide a stock material for the above abrasive.

The inventors of the present invention have investigated the processes of producing a cerium-based abrasive for each type of the stock material, noting that the abrasive will have different grinding characteristics by stock material, as discussed above. As a result, they have found that carbonate of rare earth as the stock material has a disadvantage that it is not sintered smoothly during roasting process. Insufficient sintering leads to insufficient grain growth, with the result that it is difficult to prepare a stock material of an adequate particle size and hence to secure sufficient grindability of the resultant abrasive.

On the other hand, it is also found that since an oxide of rare earth sinters smoothly during the roasting process, sintering proceeds unevenly when the oxide of rare earth is used as a stock material, with the result that part of the particles grows excessively. In this case, the abrasive from such a stock material, although excellent in grindability, tends to suffer quality dispersion and leave behind fine scratches on the ground surface, e.g., that of glass.

The inventors of the present invention have found, after having extensively studied while noting difference in properties between the carbonate and oxide of rare earth, that there is a relationship between grindability of a cerium-based abrasive and loss on ignition of the stock material, reaching the present invention.

A first aspect of the invention relates to a stock material for cerium-based abrasives, used for producing cerium-based abrasives, characterized in that it simultaneously contains a carbonate and an oxide of cerium-based rare earth and has a loss on ignition of 0.5 to 25% by weight on a dry basis, when heated at 1000° C. for 1 hour.

Loss on ignition (hereinafter also referred to as LOI) is a loss of weight of the sample heated at high temperature. A stock material for cerium-based abrasives (hereinafter referred to as merely stock material) having a higher LOI means that the final product loses more weight from the stock before roasting, to decrease productivity. It is known that LOI of the carbonate of rare earth is high at around 30% and that of the oxide of rare earth is low at around 0.5%. Therefore, LOI can serve as an index which indirectly indicates carbonate/oxide ratio for the present invention. LOI for the present invention is the level determined when the sample is heated at 1000° C. for 1 hour, based on the consideration that temperature of 1000° C. will give the level applicable as the most stable index, because the carbonate of rare earth is experimentally confirmed to have a stable LOI level when heated at 500° C. or higher. The method of determining LOI is specified in JIS-K-0067 (1992, Japanese Standards Association).

The stock material of the present invention for cerium-based abrasives has an LOI of 0.5 to 25% on a dry basis, determined by heating the sample at 1000° C. for 1 hour, preferably 1.0 to 25%, more preferably 1.0 to 20%. The stock material having an LOI in the above range for production of cerium-based abrasives secures a higher roasting productivity than the carbonate of rare earth, and, at the same time, prevents uneven sintering, which may occur when the oxide of rare earth is used, thereby allowing the sintering process to proceed more uniformly. As a result, it gives a better cerium-based abrasive both in grindability and grinding precision. More uniform sintering improves classification efficiency, contributing to improved productivity. The stock material thus produced has a lower LOI than the carbonate of rare earth, making the stock lighter by that, and reducing the stock material cost, including transportation cost.

In particular, the abrasive from a stock material having an LOI of 5.0 to 25%, more preferably 5.0 to 20%, has a higher grinding precision and leaves behind less scratches on the ground surface, e.g., that of glass. These advantages make the abrasive suitable for secondary grinding (abrasion for finishing) of highly functional glass, e.g., glass substrates for optical disks and magnetic disks. On the other hand, the abrasive from an abrasive atock having an LOI of 0.5 to 5.0%, more preferably 1.0 to 5.0%, is particularly excellent in grindability, and suitable for purposes that require high-speed grindability, e.g., primary grinding of the above-described highly functional glass.

In accordance with the Preferred Embodiments of the present invention, cerium oxide preferably accounts for 40% by weight or more of TREO, more preferably 50% by weight or more. The abrasive comprising cerium oxide in the above range can realize better grindability.

Next, one of the preferable methods of producing the stock material as the first aspect of the invention for abrasives is described.

A second aspect of the invention relates to a method of producing a stock material comprising, as main ingredients, a mixture of carbonate and oxide of cerium-based rare earth, wherein the carbonate/oxide weight ratio is set to give LOI in a range of 0.5 to 25% on a dry basis, determined by heating the mixture at 1000° C. for 1 hour.

For this method, the carbonate and oxide of rare earth are first prepared. These two types of crude materials are mixed with each other in a ratio to give an LOI of 0.5 to 25% on a dry basis, determined by heating the mixture at 1000° C. for 1 hour, preferably 1.0 to 25%, more preferably 1.0 to 20%, to prepare the stock material mixture for abrasives. More concretely, the carbonate and oxide of rare earth are weighed to have the following weight ratio for the stock material mixture:

$$L_E = L_A \times W_A/(W_A+W_B) + L_B \times W_B/(W_A+W_B) \quad (1)$$

wherein, $L_E$: target loss on ignition (0.5 to 25%)

$L_A$: loss on ignition (LOI) of the oxide of rare earth as one of the crude materials $L_B$: loss on ignition (LOI) of the carbonate of rare earth as one of the crude materials $W_A$: weight, on a dry basis, of the oxide of rare earth as one of the crude materials $W_B$: weight, on a dry basis, of the carbonate of rare earth as one of the crude materials It is preferable, when the above formula is used, to have LOI levels of the carbonate and oxide of rare earth beforehand, because the desired LOI level of the stock material can be finely controlled with these values. When LOI levels of the carbonate and oxide of rare earth are not known beforehand, the level may be determined by the method described later (First Embodiment). The standard LOI levels of the carbonate and oxide of rare earth may be also used. In this case, the prepared carbonate and oxide of rare earth are used as the crude materials without having strict LOI levels. Examples of the standard LOI levels are approximately 30% and 0.5% for the carbonate and oxide rare earth, respectively, although not limited thereto.

One of the advantages of this method is that the stock material mixture of desired LOI level can be prepared by a simple procedure of mixing the oxide and carbonate rare earth with each other in a specific weight ratio, when these materials are available.

It is essential, for a cerium-based abrasive securely having sufficient grindability, to sinter the stock particles into the abrasive particles of an adequate size by roasting, for which the carbonate or oxide of rare earth as the crude material is normally roasted at a relatively high temperature of around 1000° C. This is based on the empirical knowledge that the stock carbonate or oxide particles may not be sufficiently sintered unless roasting temperature is increased to the above level.

Increasing roasting temperature is accompanied by a disadvantage of causing abnormal particle growth, although bringing about an advantage of accelerated sintering. The abnormal growth may produce the coarse particles, which may sometimes enter the final product, i.e., abrasive. Content of these coarse particles must be reduced as far as possible, because they may scratch the surface the abrasive tries to grind. They are usually removed by the classification process, subsequent to the roasting process, which adjusts the particle size. The severe classification conditions to remove the coarse particles will decrease productivity of the abrasive, pushing up its production cost.

It is therefore preferable to decrease roasting temperature as far as possible, in order to control the abnormal particle growth during the roasting process, thereby controlling contamination of the abrasive with the coarse particles while securing productivity.

The inventors of the present invention have extensively studied to develop a method of producing an stock material which can sinter the stock particle at a relatively low roasting temperature for production of the abrasives while causing no abnormal growth of the particles, and the stock material produced by the above method and cerium-based abrasive therefrom capable of giving high-quality ground surfaces. They have studied, during the above process, the mechanisms involved in the roasting of the carbonate and oxide of rare earth. They are now sustaining the following phenomena as the reasons why the carbonate and oxide of rare earth need roasting at high temperature:

FIG. 1 illustrates the phenomena involved in roasting of the carbonate of rare earth. The as-received carbonate of rare earth as the stock material is composed of agglomerates with the coarse carbonate of rare earth particles bound to each other. The process of producing an abrasive from the carbonate of rare earth starts with crushing of the stock material. The agglomerated carbonate of rare earth is composed of the particles strongly bound to each other, and is frequently subjected to wet crushing in which the slurried stock material is crushed. The slurry is sufficiently viscous for the cohesive force which bounds the carbonate particles to each other, deteriorating crushing efficiency and making it difficult to completely crush them into the fine particles. As a result, the coarse particles partly remain in the crushed fine particles of the carbonate of rare earth.

The crushed stock material is fluorination-treated, wherein part of the carbonate component in the carbonate of the rare earth is exchanged with fluorine. The coarse particles are disintegrated while the carbonate is partly fluorinated. However, the coarse particles cannot be completely disintegrated, because of quantity of fluorine for the fluorination is limited from the fluorine content of the final product.

The partly fluorinated carbonate of rare earth is then subjected to roasting, wherein most of the carbonate component in the stock material is released as $CO_2$. This leaves low-density, porous, shell-like particles of the carbonate of rare earth. Sintering of these shell-like particles is so low and needs high temperature to proceed. In particular, the carbonate of rare earth contains a high proportion of coarse particles, as described earlier, which become very slow-sintering shell-like particles during the roasting process. Therefore, high roasting temperature is needed for the carbonate of rare earth as the stock material for abrasives.

FIG. 2 illustrates the sintering mechanism involved in roasting of the oxide of rare earth. The oxide of rare earth is produced by calcination of the carbonate of rare earth, as described earlier, and the carbonate as the stock material for the oxide contains coarse particles, as shown in FIG. 1. Calcination of the carbonate releases the carbonate component to form the shell-like particles, which are fragile and disintegrated by the impacts to which they are exposed during the roasting process with the result that the carbonate particles, fine to some extent, are formed. These fine carbonate particles are oxidized by the subsequent heating into the oxide particles.

However, the oxide particles are sintered and agglomerated to each other during the high-temperature calcination process. They are bound to each other strongly, some retaining their shapes even when subjected to the crushing process. The fluorination treatment cannot completely fluorinate these particles, leaving the oxide at the center.

The uneven fluorination should have adverse effects on the sintering process while the particles are being roasted. Namely, these unevenly fluorinated agglomerates are disintegrated under heating and impacts during the roasting process, leaving a mixture of the sufficiently-fluorinated oxide particles and the others not fluorinated or fluorinated only to have an insufficient fluorine content. The former is sintered fast, whereas the latter cannot be sintered fast unless roasting temperature is increased to a fairly high level. Therefore, high roasting temperature is needed for the oxide of rare earth as the stock material for abrasives.

The inventors of the present invention presumed, taking into consideration the above-described hypothetical sintering mechanisms of the carbonate and oxide rare earth, that the above problems would be solved by calcinating the carbonate particles prior to crushing, as is the case with the oxide particles, in order to partly convert the carbonate into the oxide, as the stock-producing method capable of effecting uniform fluorination. The partial calcination process is illustrated in FIG. 3.

The partial calcination process treats the carbonate of rare earth in a manner similar to the process for producing the oxide of rare earth, and changes the carbonate similarly during the initial stage. In other words, the carbonate component is released as $CO_2$, leaving behind the shell-like particles, which are disintegrated into the finer carbonate particles. These particles are oxidized, to have oxide content of the particles increasing with heating time. The partial calcination process for the present invention stops calcination before the carbonate is completely converted into the oxide, leaving a mixture of the carbonate and oxide for the stock material.

The mixed rare earth particles produced by the partial calcination process are subsequently subjected to the crushing and fluorination processes to disintegrate the residual shell-like particles and further crush the particles. The fluorination process, free of the agglomerated particles which are present in the case of the oxide treatment, can be effected uniformly. As a result, the particles are sintered at relatively low temperature during the calcination process, because of lack of the causes for retarding the sintering, e.g., shell-like particles and insufficiently fluorinated particles.

In this way, the partial calcination the inventors propose can produce a stock material while avoiding the problems that the carbonate and oxide rare earth are difficult to sinter unless treated at high temperature. These findings have led to development of the following method, the third invention.

A third aspect of the invention relates to a method of producing a stock material for cerium-based abrasives comprising, as main ingredients, a mixture of carbonate and oxide of cerium-based rare earth, wherein the carbonate of cerium-based rare earth is partly converted into the oxide by calcination under conditions of temperature and time adjusted in such a way to give a stock material mixture LOI of 0.5 to 25% on a dry basis, determined by heating the mixture at 1000° C. for 1 hour.

For this method, the carbonate of rare earth is first prepared. The crude material of the carbonate of rare earth is partly converted into the oxide by calcination, to produce the stock material mixture of the carbonate and oxide for abrasives. The calcination decomposes the carbonate into the oxide. Calcination temperature and time are adjusted in such a way to give stock material mixture LOI of 0.5 to 25% on a dry basis, determined by heating the mixture at 1000° C. for 1 hour, preferably 1.0 to 25%, more preferably 1.0 to 20%. Calcination temperature and time are not limited, and may be adequately set to give a desired LOI. However, calcination temperature is preferably 150 to 850° C., more preferably 400 to 850° C., and calcination time is preferably 60 hours or less, more preferably 6 minutes to 48 hours, still more preferably 10 minutes to 24 hours.

This method needs only one type of the crude material, the carbonate of rare earth, which is one of its advantages. It is not necessary to prepare two or more types of the crude materials, which makes this method very economical and high in productivity. It can adjust LOI of the stock material at a desired level by very simple procedure of controlling temperature and time for calcination.

The stock material of the first aspect of the invention, or the one produced by the method of the second or third aspect of the invention gives the cerium-based abrasive excellent in grindability and leaving behind little scratches on the ground surface. More concretely, the stock materials prepared are subjected to the normal process for producing abrasives, comprising slurrying and/or wet crushing, treatment with a mineral acid (as required), fluorination (also as required), filtration, drying, and roasting. It is preferable that the fluorination, if adopted, is effected with the aid of ammonium fluoride and/or hydrofluoric acid.

It is essential for the partial calcination the inventors have proposed how the carbonate of rare earth is oxidized to a desired extent. When excessively heated during the calcination process, the carbonate of rare earth will be completely converted into the oxide, causing uneven fluorination as discussed earlier. When insufficiently heated, on the other hand, the shell-like particles are not sufficiently disintegrated. In either case, the stock material will have insufficient sinterability. The inventors of the present invention have extensively studied to find out the differential calcination conditions for production of stock material, reaching the fourth invention.

A fourth aspect of the invention relates to a method of producing a stock material for cerium-based abrasives comprising, as the main ingredients, a mixture of carbonate and oxide of cerium-based rare earth, wherein the carbonate is calcined at 400 to 850° C. to be partly converted into the oxide.

The reason for setting calcination temperature at 400 to 850° C. is that the carbonate of rare earth can release the carbonate component to an adequate extent. At higher than 850° C., the carbonate is quickly oxidized and completely converted into the oxide. At lower than 400° C., on the other hand, both release of the carbonate component and disintegration of the coarse particles are insufficient. Calcination time is preferably 0.1 to 48 hours, as described in claim 12, when it is effected at a temperature in the above range, to similarly release the carbonate component from the carbonate to an adequate extent.

The stock material mixture produced by this method are directly applicable to the stock materials for conventional production process for producing cerium-based abrasives, and the crushing efficiently removes the coarse particles and fluorination uniformly fluorinates the stock particles, to decrease temperature for the roasting process.

The more preferable stock material contains the one for cerium-based abrasives and has an LOI of 1.0 to 20% on a dry basis, determined by heating the sample at 1000° C. for 1 hour, viewed from sinterability, convenience for transportation and productivity of the abrasive as the final product, as described in claim 14.

The reason for setting LOI at 1.0 to 20% is that the stock material sufficiently and uniformly sintered at relatively low temperature during the roasting process when it has an LOI in the above range, according to the test results obtained by the inventors, to give the abrasive having relatively high grindability and leaving behind little scratches on the ground surface. The stock material can have an LOI of 1.0 to 20% by heating the carbonate of rare earth in such a way to adjust the carbonate/oxide ratio for the mixture having a desired LOI during the calcination process effected under the above-described temperature and time conditions. LOI may be also adjusted at a desired level by incorporating the stock material mixture produced by this method with the carbonate or oxide of rare earth.

The stock material related to the present invention can be sintered at a sufficient rate even at relatively low temperature, as discussed above. The invention of claim 15 of the present invention relates to the method of producing a cerium-based abrasive, comprising crushing and fluorinating the above stock material, and roasting the fluorinated stock material at 700 to 1000° C. Roasting at such a relatively low temperature level can control abnormal growth of the particles for the cerium-based abrasive which can give a high-quality surface free of scratches.

This method of producing a cerium-based abrasive involves fluorination prior to roasting, which is preferably effected in the presence of hydrofluoric acid or ammonium fluoride. The latter is more preferable, because it allows the fluorination process to proceed at a mild rate to distribute fluorine more uniformly in the stock material, and hence the roasting process to be effected at a lower temperature level.

BRIEF DESCRIPTION OF THE DRAWINGS

In particular, FIG. 1(*a*) shows the carbonate of rare earth, which then undergoes a crushing step (FIG. 1(*b*)), followed by a fluorinating step to produce a fluorinated carbonate of rare earth (FIG. 1(*c*)). The fluorinated carbonate of rare earth is then, subjected to a roasting step in which $CO_2$ is released to yield a fluorinated oxide of rare earth (FIG. 1(*d*)). FIG. 2(*a*) illustrates a carbonate of rare earth which undergoes a calcining step to release $CO_2$ and produce the oxide of rare earth shown in FIG. 2(*b*). The oxide of rare earth then undergoes a crushing step to produce the agglomerate oxide of FIG. 2(*c*) which is then subjected to a fluorinating step to produce the fluorinated oxide of rare earth shown in FIG. 2(*d*). FIG. 2(*d*) also shows insufficiently-fluorinated oxide of rare earth. FIG. 3(*a*) shows a carbonate of rare earth that undergoes a calcining step in which $CO_2$ is released and a mixture of oxide rare earth and carbonate rare earth are formed (FIG. 3(*b–c*)). The mixture is then crushed and fluorinated to produce the fluorinated mixture of oxide of rare earth and carbonate rare earth shown in FIG. 3(*d*).

MODES FOR CARRYING OUT THE INVENTION

Figure 1:
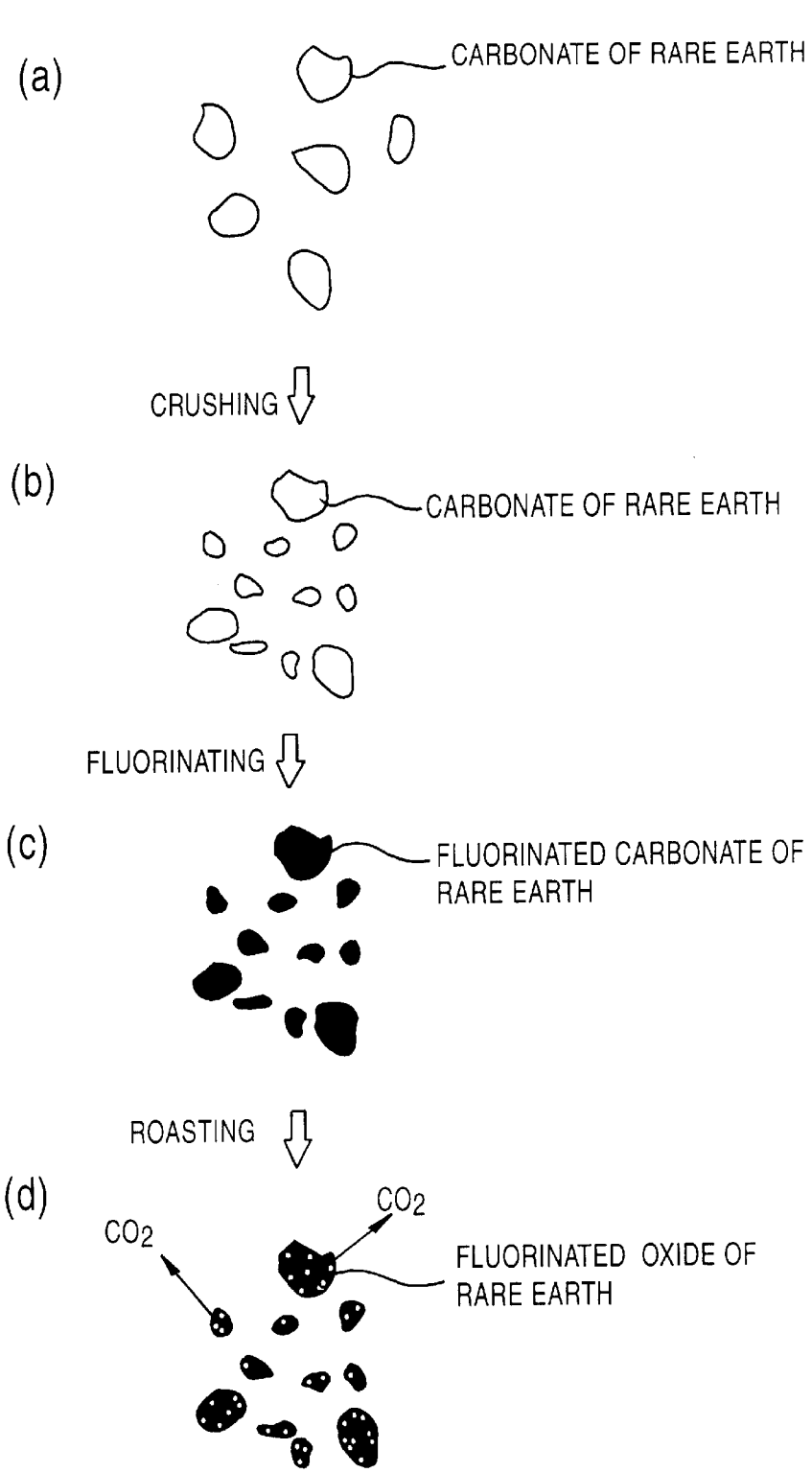
FIG. 1 illustrates the changed conditions of the carbonate of rare earth particles during the process of producing the abrasive.
Figure 2:
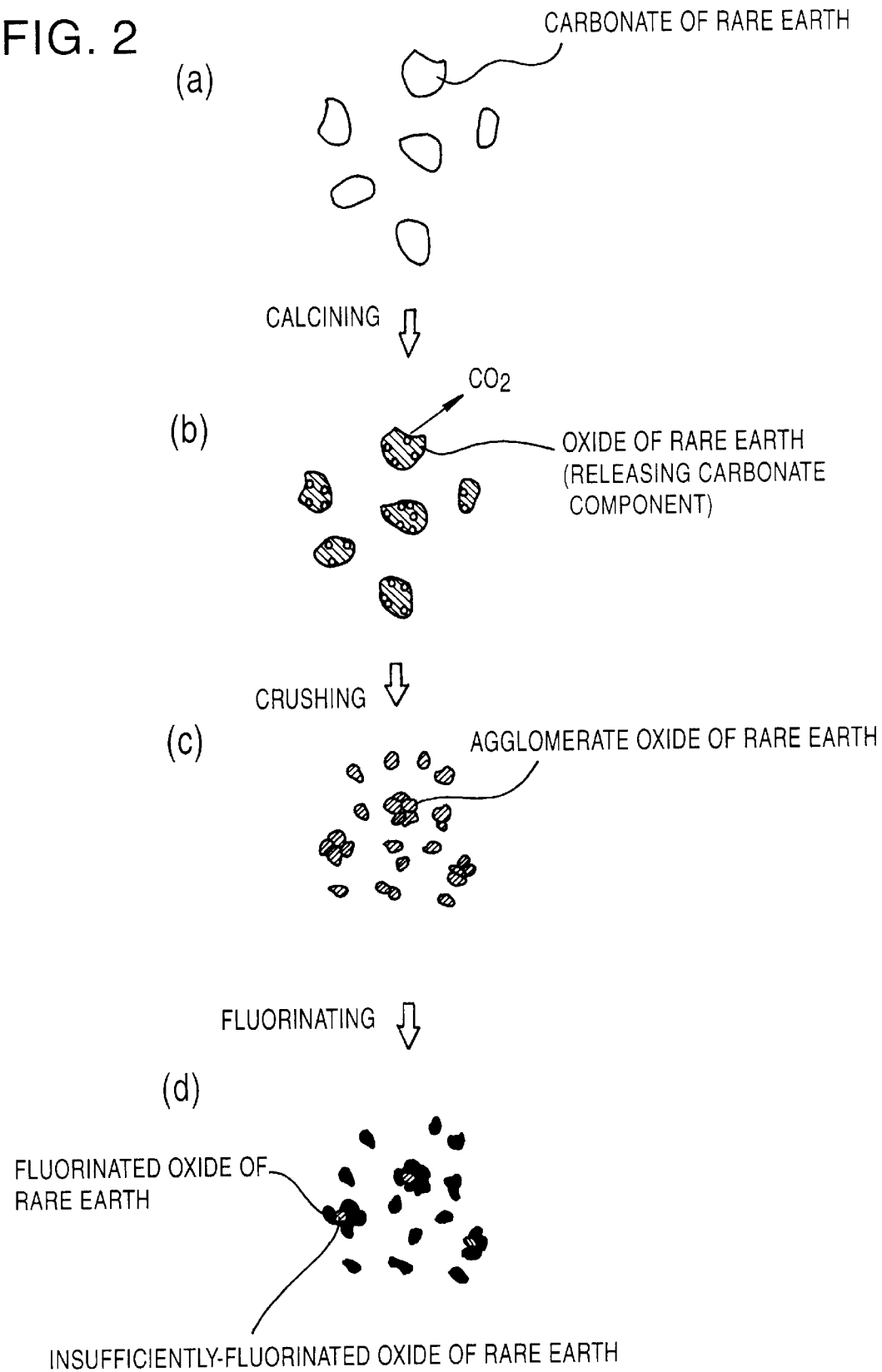
FIG. 2 illustrates the changed conditions of the oxide of rare earth particles during the process of producing the abrasive.
Figure 3:
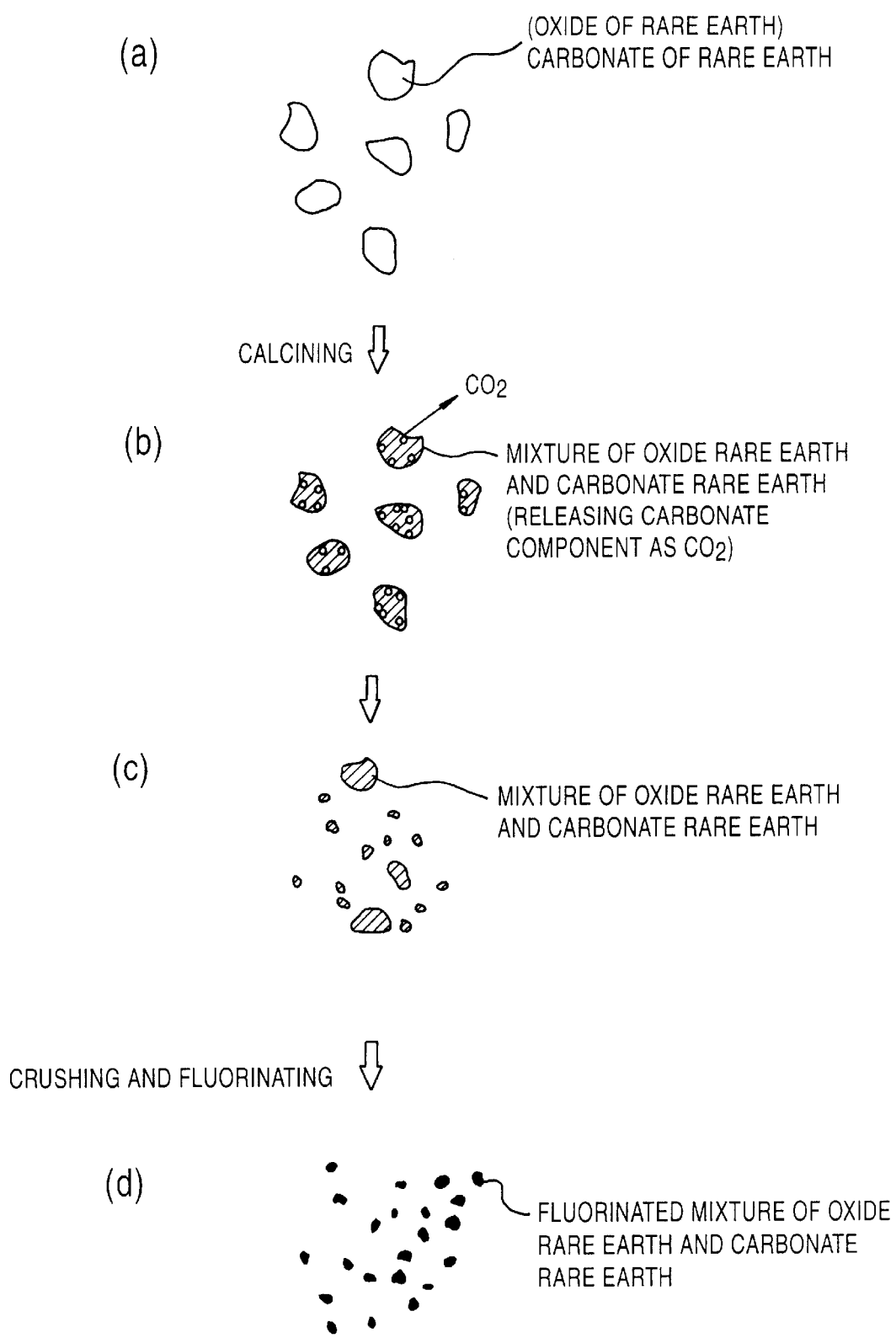
FIG. 3 illustrates the changed conditions of the stock particles for abrasives during the partial calcination process for the present invention.

Preferred embodiments of the present invention are described together with Comparative Examples.

Two types of the crude materials were prepared for the cerium-based abrasives, the oxide of rare earth as Stock A and carbonate of rare earth as Stock B, both made in China. Table 1 gives LOI levels and oxide-based compositions of these crude materials.

TABLE 1

|  | Stock A (oxide of rare earth) | Stock B (carbonate of rare earth) |
| --- | --- | --- |
| Loss on ignition (%) | 0.6 | 30.0 |
| Rare earth oxide components (TREO: total quantity of total rare earth oxides) | 99.1 | 69.5 |
| $CeO_2$/TREO | 60.0 | 58.0 |
| $La_2O_3$/TREO | 34.5 | 27.9 |
| $Pr_6O_{11}$/TREO | 4.5 | 7.6 |
| $Nd_2O_3$/TREO | 1.0 | 6.7 |
| F | 0.2 | <0.1 |
| CaO | 0.1 | 0.05* |
| BaO | 0.2 | 0.01* |
| $P_2O_5$ | 0.02 | 0.03* |
| $SiO_2$ | 0.01 |  |
| Fe | 0.01 |  |

*Content of Ca, Ba or P
(Unit: % by weight)

The LOI in Table 1 means a weight loss percentage of the sufficiently dried crude material heated at 1000° C. for 1 hour, and was determined by the following procedure. First, the crucible was weighed to the order of 0.1 mg. The sample to be analyzed (crude material) was sufficiently dried under heating at 105° C. for 1 hour, and put in the crucible to be weighed to the order of 0.1 mg. The sample-containing crucible was heated at high temperature in an electrical oven, where temperature was gradually elevated. The crucible was heated at 1000° C. for 1 hour, and then immediately transferred in a desiccator, where it was allowed to stand for cooling. It was then weighed to the order of 0.1 mg. Loss on ignition (LOI) was determined, based on the above results, by the following formula. The same procedure was followed for determining LOI for all of the samples.

$$L = \{(W_1 - W_2)/(W_1 - W_3)\} \times 100 \qquad (2)$$

wherein,

L: loss on ignition (%)

$W_1$: total weight of the sample and crucible before heating at 1000° C. (g)

$W_2$: total weight of the sample and crucible after heating at 1000° C. (g)

$W_3$: weight of the crucible (g)

Stock A was mixed with stock B in adequate ratios, to prepare stock materials for Embodiments and Comparative Examples described later. For example, when the stock material having an LOI of 2.0% was to be prepared, Stocks A and B were weighed and mixed with each other to have LOI ($L_E$ in the following formula) of 2.0%. This stock material was the one for the present invention.

$$L_E = 0.6 \times W_A/(W_A+W_B) + 30 \times W_B/(W_A+W_B) \quad (3)$$

wherein, $W_A$: weight, on a dry basis, of the oxide of rare earth as one of the crude materials $W_B$: weight, on a dry basis, of the carbonate of rare earth as one of the crude materials First Embodiment Stock A was used as a stock material for producing a cerium-based abrasive. First, it was ball-milled in the presence of a solvent to have the powder having an average particle size of 10 μm. This powder was treated with a mineral acid (1 mol/1 hydrochloric acid), and then with a 15 g/L aqueous solution of ammonium fluoride to prepare the slurry, which was filtered and dried into dry cake. The resultant cake was roasted in an electrical oven at 920° C. for 2 hours, and then allowed to stand for cooling. It was then crushed and classified to prepare the cerium-based abrasive of the present invention.

Second to 8th Embodiments

Stock A was mixed with Stock B in adequate ratios to prepare the stock materials for cerium-based abrasives having an LOI ($L_E$ in the formula (3)) of 2.0, 3.0, 5.0, 7.0, 10, 20 and 25%. The cerium-based abrasive was prepared in the same manner as in First Embodiment using each of the above stock materials.

COMPARATIVE EXAMPLE 1

The cerium-based abrasive was prepared in the same manner as in First Embodiment using only Stock B as the comparative example for First Embodiment.

Each of the above abrasives was tested to evaluate grindability and ground surface conditions, where the abrasive was dispersed in water to have a 10 wt. % abrasive slurry. The slurry was kept stirred by an agitator during the grinding test period, to prevent the abrasive from settling. Glass for a 65 mm-diameter planar panel as the glass sample was ground by a high-speed grinder using a grinding pad of polyurethane under the conditions of abrasive slurry feeding rate: 5 l/minute, pressure on the ground surface: 15.7 kg/cm², and rotation speed of the grinder: 1,000 rpm. The ground sample was washed with pure water, and dried in a dust-free atmosphere. The ground glass surface was then evaluated for grindability of the abrasive and finished conditions of the ground surface.

For evaluation of grindability, the glass sample was weighed before and after the grinding to determine weight loss, by which grindability of the abrasive was evaluated. The results are given in Table 2, where the weight loss with the abrasive prepared by Comparative Example 1 is used as the standard (100) and the relative values are reported.

Evaluation of scratches (for the finished conditions of the ground surface) was based on presence or absence of the scratches. More concretely, the ground surface was irradiated with light from a halogen lamp (300,000 lux) to observe the glass surface by the reflection method. The scratches were evaluated by the extent (size and the numbers) thereof, scored by deducting points from 100 points. The results are also given in Table 2.

Each abrasive was comprehensively evaluated according to the 3-grade system (A, B and C), based on the results of grindability and scratches. The comprehensive evaluation is for simply and relatively grasping quality of each cerium-based abrasive prepared by each Embodiment or Comparative Example. It should be noted that the threshold level for the comprehensive evaluation (e.g., grindability of 102 for differentiating comprehensive evaluation scores B and C from each other) is not an absolute standard. The results are also given in Table 2.

TABLE 2

| Samples | LOI of calcined stock material (%) | Roasting conditions, temperature (° C.) × time (h) | *Grind-ability | Scratches | *Comprehensive Evaluation |
|---|---|---|---|---|---|
| First Embodiment | 0.6 | 920 × 2 | 115 | 90 | B |
| Second Embodiment | 2.0 | 920 × 2 | 114 | 91 | B |
| Third Embodiment | 3.0 | 920 × 2 | 113 | 91 | B |
| 4th Embodiment | 5.0 | 920 × 2 | 110 | 96 | A |
| 5th Embodiment | 7.0 | 920 × 2 | 110 | 98 | A |
| 6th Embodiment | 10.0 | 920 × 2 | 110 | 95 | A |
| 7th Embodiment | 20.0 | 920 × 2 | 110 | 98 | A |
| 8th Embodiment | 25.0 | 920 × 2 | 110 | 97 | A |
| Comparative Example 1 | 30.0 | 920 × 2 | 100 | 97 | C |

*Grindability: Relative value, where weight loss with the abrasive prepared by Comparative Example 1 is used as the standard (100).
*Comprehensive Evaluation
A: Grindability of 107 or more, and score of scratches: 95 or more
B: Grindability of 102 or more, score of scratches: 90 or more, and excluded from Evaluation A
C: Grindability less than 102, and score of scratches less than 90

As shown in Table 2, the cerium-based abrasives prepared by First to 8th Embodiments have good grindability and generally good score of scratches. On the other hand, the abrasive prepared by Comparative Example 1 with the carbonate rare earth as the stock material has notably low grindability, although acceptable with respect to score of scratches.

9th Embodiment

The carbonate of rare earth (Stock B), described in Table 1, was used as the crude material. It was calcined at 1000° C. for 1 hour, to prepare the stock material for cerium-based abrasives. LOI was measured using a part of stock material for abrasive thus obtained. It was found that the LOI of the stock material for abrasives prepared by this embodiment was 0.6%.

10th to 15th Embodiments

The carbonate of rare earth (Stock B), described in Table 1, was calcined in the same manner as in 9th Embodiment except under different conditions with respect to temperature and time, to prepare the stock materials for cerium-based abrasives. Each stock material was measured for LOI using a part of the stock materials thus obtained in a similar manner. The calcination conditions of 10th to 15th Embodiments and LOI levels of the stock materials prepared were 1000° C./0.7 hours and 2.0%, 1000° C./0.5 hours and 3.0%, 400° C./10 hours and 5.0%, 400° C./4 hours and 7.0%, 400° C./2 hours and 9.0%, and 400° C./1 hour and 19%, respectively.

COMPARATIVE EXAMPLE 2

The cerium-based abrasive was prepared by calcinating Stock B at 1000° C. for 2 hours as the comparative example for Second Embodiment. The stock material for abrasives obtained had an LOI of 0.1%.

COMPARATIVE EXAMPLE 3

This is also a comparative example for Second Embodiment, wherein as-received Stock B was used as a stock material. It had an LOI of 30%.

The cerium-based abrasive was prepared from each of the above stock materials, and evaluated for grindability and scratches (for the finished conditions of the ground surface) for the comprehensive evaluation. It was prepared in a manner similar to that for First Embodiment. Grindability and scratches were evaluated by the same procedures as described earlier, and each abrasive was comprehensively evaluated also in the same manner as described earlier. The results are given in Table 3.

TABLE 3

| Samples | Roasting conditions, temperature (° C.) × time (h) | LOI of calcined stock material (%) | Roasting conditions, temperature (° C.) × time (h) | Evaluation of abrasives | | * Comprehensive Evaluation |
|---|---|---|---|---|---|---|
| | | | | * Grindability | prescratches | |
| Comparative Example 2 | 1000 × 2 | 0.1 | 920 × 2 | 120 | 88 | C |
| 9th Embodiment | 1000 × 1 | 0.6 | 920 × 2 | 115 | 90 | B |
| 10th Embodiment | 1000 × 0.7 | 2.0 | 920 × 2 | 114 | 91 | B |
| 11th Embodiment | 1000 × 0.5 | 3.0 | 920 × 2 | 114 | 91 | B |
| 12th Embodiment | 400 × 10 | 5.0 | 920 ' 2 | 111 | 95 | A |
| 13th Embodiment | 400 × 4 | 7.0 | 920 × 2 | 111 | 96 | A |
| 14th Embodiment | 400 × 2 | 9.0 | 920 × 2 | 109 | 98 | A |
| 15th Embodiment | 400 × 1 | 19.0 | 920 × 2 | 111 | 99 | A |
| Comparative Example 3 | — | 30.0 | 920 × 2 | 100 | 98 | C |

*Grindability: Relative value, where weight loss with the abrasive prepared by Comparative Example 3 is used as the standard (100).
*Comprehensive evaluation
A: Grindability of 107 or more, and score of scratches: 95 or more
B: Grindability of 102 or more, score of scratches: 90 or more, and excluded from Evaluation A
C: Grindability less than 102, and score of scratches less than 90

As shown in Table 3, the cerium-based abrasives prepared by 9th to 15th Embodiments have good grindability and generally good score of scratches. The abrasives prepared by 9th to 11th Embodiments have lower score of scratches than those prepared by other Embodiments, but score of scratches of the former abrasives is by itself acceptable. On the other hand, the cerium-based abrasive prepared by Comparative Example 3 with the as-received carbonate rare earth as the stock material (Stock B) has notably low grindability, although acceptable with respect to score of scratches.

16th Embodiment

First, 20 kg of the carbonate of rare earth with cerium oxide accounting for 60% of TREO (TREO: 70% by weight on a dry basis) was calcined at 500° C. for 2 hours in a muffle furnace, to prepare the stock material for cerium-based abrasives. LOI was then measured. It was found that this stock material had an LOI of 5.0%.

Next, 2 kg of the above stock material was ball-milled together with 2 L of pure water by a 5 L mill containing 12 kg of 5 mm-diameter steel balls as the grinding medium for 5 hours, to prepare the slurry containing the powder having average particle size of 1 μm (cumulative particle size at 50%, determined by the microtrack method D50). The ball-milled slurry was then incorporated with a 1 mol/L solution of ammonium fluoride to have the final abrasive containing fluorine at 6%, washed with pure water and filtered to prepare the cake. The cake was dried, roasted at 900° C. for 3 hours, crushed again and classified to prepare the cerium-based abrasive.

17th to 19th Embodiments

The stock material prepared by 16th Embodiment was roasted in the same manner as in 16th Embodiment except that temperature was changed to 850, 950 or 1050° C., to prepare the cerium-based abrasives.

20th Embodiment

The same carbonate of rare earth as that for 16th Embodiment was calcined under different conditions of 400° C. and 18 hours, to prepare the stock material. It had an LOI of 5.0%. The cerium-based abrasive was prepared from the above stock material in the same manner as in 16th Embodiment except that the stock material was roasted at 900° C.

21st to 23rd Embodiments

The stock material prepared by 20th Embodiment was roasted in the same manner as in 20th Embodiment except that temperature was changed to 850, 950 or 1050° C., to prepare the cerium-based abrasives.

COMPARATIVE EXAMPLE 4

The cerium-based abrasive composed of the oxide of rare earth converted from the carbonate of rare earth by calcination was prepared as the comparative example for 16th to 23rd Embodiments, and the cerium-based abrasive was prepared from the above stock material. For production of the oxide of rare earth, 20 kg of the same carbonate of rare earth as that for 16th Embodiment was calcined at 900° C. for 3 hours in a muffle furnace into the oxide. The cerium-based abrasive was prepared in the same manner as in 16th Embodiment except that roasting temperature was set at 980° C.

COMPARATIVE EXAMPLES 5 to 8

The oxide of rare earth as the stock material prepared by Comparative Example 4 was roasted in the same manner as in Comparative Example 4 except that temperature was changed to 850, 950 or 1050° C., to prepare the cerium-based abrasives.

COMPARATIVE EXAMPLE 9

The cerium-based abrasive was prepared from the same stock material of the carbonate as that for 16th Embodiment under the same conditions, including roasting conditions, as those for Comparative Example 4.

COMPARATIVE EXAMPLES 10 to 13

The same stock material of the oxide of rare earth as that for Comparative Example 9 was roasted in the same manner as in Comparative Example 9 except that temperature was changed to 850, 950 or 1050° C., to prepare the cerium-based abrasives.

Of the cerium-based abrasives prepared above, those prepared by 17th to 19th and 21st to 23rd Embodiments were compared with those prepared by Comparative Examples 5, 7 and 8 and, Comparative Examples 10, 12 and 13 for size of the roasted abrasive particles. These abrasives were roasted at varying temperatures. The size was represented by specific surface area, determined by the BET method. The results are given in Table 4.

TABLE 4

|  | Calcination temperature/ time | Specific surface area (m²/g) | | |
| --- | --- | --- | --- | --- |
|  |  | Roasting temperature 850° C. | Roasting temperature 950° C. | Roasting temperature 1050° C. |
| 17th or 19th Embodiments | 500° C. × 2 h | 14.69 | 1.88 | 1.64 |
| 21st or 23rd Embodiments | 400° C. × 18 h | 3.38 | 1.68 | 1.64 |
| Comparative Examples 5, 7 and 8 (Oxide or rare earth) | 900° C. × 3 h | 4.88 | 3.64 | 1.71 |
| Comparative Examples 10, 12 and 13 (Carbonate of rare earth) | — | 12.24 | 3.70 | 1.68 |

It is confirmed by these results that specific surface area of the abrasive from the oxide or carbonate of rare earth as the stock material cannot be decreased, by which is meant that the oxide or carbonate cannot be sufficiently sintered, unless it is treated at a fairly high temperature level of 1050° C. On the other hand, the cerium-based abrasives prepared by 17th to 19th and 21st to 23rd Embodiments have a relatively small specific surface area even when their stock materials are roasted at around 850° C., indicating that their stock materials can be easily sintered by calcination at a relatively low temperature level.

Next, the cerium-based abrasives prepared by 16th and 20th Embodiments were compared with those prepared by Comparative Examples 4, 6, 9 and 11 for content of coarse particles (those having a particle size of 10 μm or more), and grindability and conditions of the glass surfaces ground by these abrasives.

Content of the coarse particles was determined by the following procedure. Each cerium-based abrasive (200 g) was dispersed in an aqueous solution dissolving 0.1% of sodium hexametaphosphate as the dispersant with stirring for 2 minutes, to prepare the slurry. The slurry was filtered by a microsieve (pore size: 10 μm), and the residue remaining on the sieve was recovered. The recovered residue was dispersed again in a 0.1% sodium hexametaphosphate solution with stirring by ultrasonic waves for 1 minute to be slurried. The slurry was filtered by a microsieve (pore size: 10 μm) The recovered residue was slurried and filtered both twice, to recover the coarse particles. These coarse particles are then sufficiently dried and weighed, to determine content of the coarse particles.

These abrasives were evaluated for grindability and conditions of the surfaces ground by them by the procedures described earlier. The results are given in Table 5, where the weight loss with the abrasive prepared by Comparative Example 11 is used as the standard (100) and the relative values are reported.

TABLE 5

| Samples | Roasting conditions, temperature (° C.) × time (h) | LOI of calcined stock material (%) | Roasting conditions, temperature (° C.) × time (h) | Specific surface area (m²/g) | Content of the coarse particles (ppm) | Evaluation of abrasives | | |
| --- | --- | --- | --- | --- | --- | --- | --- | --- |
|  |  |  |  |  |  | *Grindability | Scratches | *Comprehensive Evaluation |
| 16th Embodiment | 500 × 2 | 5.0 | 900 × 3 | 2.98 | 12 | 118 | 99 | A |
| 20th Embodiment | 400 × 18 | 5.0 | 870 × 3 | 2.96 | 10 or less | 120 | 100 | A |
| Comparative Example 4 | 900 × 3 | 0.7 | 980 × 3 | 3.07 | 550 | 114 | 93 | B |
| Comparative Example 6 | 900 × 3 | 0.7 | 900 × 3 | 4.22 | 60 | 104 | 96 | B |
| Comparative Example 9 | — | 30.0 | 980 × 3 | 3.00 | 450 | 110 | 91 | B |
| Comparative Example 11 | — | 30.0 | 900 × 3 | 5.60 | 10 or less | 100 | 99 | C |

*Grindability: Relative value, where weight loss with the abrasive prepared by Comparative Example 11 is used as the standard (100).
*Comprehensive evaluation
A: Grindability of 107 or more, and score of scratches: 95 or more
B: Grindability of 102 or more, score of scratches: 90 or more, and excluded from Evaluation A
C: Grindability less than 102, and score of scratches less than 90

As shown in Table 5, the cerium-based abrasives prepared by 16th and 20th Embodiments have good grindability and can produce good ground surfaces leaving behind little scratches. On the other hand, the cerium-based abrasives prepared by Comparative Examples, which used the oxide and carbonate rare earth as the stock materials, show lower grindability than those prepared by these Embodiments because of their lower sinterability, although comparable to them in the evaluation of scratches when roasted at similar temperature. Elevated roasting temperature increased their grindability to some extent, which, however, was accompanied by increased scratches left on the ground surfaces, taking off the evaluation of scratches. These results can be explained by the coarse particles remaining in the abrasives prepared by Comparative Examples 4 and 9 at 400 ppm or more, as indicated by the measured coarse particle contents. These coarse particles are considered to result from the abnormal growth of the oxide and carbonate of rare earth particles roasted at high temperature, and remain in the abrasives as the final products.

24th Embodiment

The stock material for cerium-based abrasives was prepared by calcining 3 kg of the carbonate of rare earth having TREO of 69.5 wt % on a dry basis (cerium oxide accounting for 58 wt % of TREO) at 650° C. for 12 hours in an electrical oven. LOI was measured and it was found that this stock material had an LOI of 3.2%. The cerium-based abrasive was prepared from the above stock material in the same manner as in 16th Embodiment except that the stock material was roasted at 920° C. for 2 hours before the second crushing.

25th and 26th Embodiments

The carbonate of rare earth, similar to that for 24th Embodiment, was calcined in the same manner as in 24th Embodiment except under different conditions with respect to temperature and time, to prepare the stock materials. Each stock material was measured for LOI. The cerium-based abrasives were prepared from the above stock materials in the same manner as in 24th Embodiment. The calcination conditions of 25th and 26th Embodiments and LOI levels of the stock materials prepared were 750° C./6 hours and 3.0% for 25th Embodiment, and 850° C./3 hours and 2.9% for 26th Embodiment, respectively.

COMPARATIVE EXAMPLE 14

The carbonate of rare earth, similar to that for 24th Embodiment, was calcined at 1000° C. for 5 hours in an electrical oven, to prepare the stock material (oxide of rare earth) The stock material had an LOI of less than 0.05%. The cerium-based abrasive was prepared from the above stock material in the same manner as in 24th Embodiment, except that roasting temperature was set at 980° C.

COMPARATIVE EXAMPLE 15

The carbonate of rare earth (LOI: 30%), similar to that for 24th Embodiment, was used as the stock material (oxide of rare earth). The cerium-based abrasive was prepared from the above stock material in the same manner as in Comparative Example 14, including roasting temperature.

These cerium-group abrasives prepared in 24th to 26th Embodiments and Comparative Examples 14 and 15 were evaluated for grindability and conditions of the surfaces ground by them by the procedures described earlier. The results are given in Table 6, where the weight loss with the abrasive prepared by Comparative Example 15 is used as the standard (100) and the relative values are shown.

TABLE 6

| Samples | Roasting conditions, temperature (° C.) × time (h) | LOI of calcined stock material (%) | Roasting conditions, temperature (° C.) × time (h) | Grindability* | Scratches | *Comprehensive Evaluation |
|---|---|---|---|---|---|---|
| 24th Embodiment | 650 × 12 | 3.2 | 920 × 2 | 113 | 98 | A |
| 25th Embodiment | 750 × 6 | 3.0 | 920 × 2 | 114 | 98 | A |
| 26th Embodiment | 850 × 3 | 2.9 | 920 × 2 | 114 | 94 | B |
| Comparative Example 14 | 1000 × 5 | <0.05 | 980 × 2 | 112 | 80 | C |
| Comparative Example 15 | — | 30.0 | 980 × 2 | 100 | 98 | C |

*Grindability: Relative value, where weight loss with the abrasive prepared by Comparative Example 15 is used as the standard (100).
*Comprehensive evaluation
A: Grindability of 107 or more, and score of scratches: 95 or more
B: Grindability of 102 or more, score of scratches: 90 or more, and excluded from Evaluation A
C: Grindability less than 102, and score of scratches less than 90

As shown in Table 6, the cerium-based abrasives prepared by 24th to 26th Embodiments have good grindability and can produce good ground surfaces leaving behind little scratches. It is particularly noted that the abrasives prepared by 24th and 25th Embodiments show better evaluation results with respect to scratches, indicating that calcination temperature is preferably 800° C. or lower. On the other hand, the cerium-based abrasive prepared by Comparative Example 14 is inferior to those prepared by 24th to 26th Embodiments in the evaluation of scratches, although good in grindability. These results can be explained by the coarse particles formed by the accelerated calcination under the severer conditions of 1000° C. for 5 hours for Comparative Example 14 to cause abnormal growth of the particles, and remaining in the abrasive in spite of crushing subsequent to the calcination. These results indicate that increasing calcination time accelerates calcination, tending to degrade the evaluation of scratches. The cerium-based abrasive prepared by Comparative Example 15 is inferior to those prepared by 24th to 26th Embodiments in grindability, although good in the evaluation of scratches. The carbonate of rare earth is low in crushing efficiency, and roasted while containing the coarse particles. It is considered, therefore, that these particles are sintered too slowly during the roasting process to grow to an adequate size.

Table 7 summarizes part of the data given in Tables 3, 5 and 6.

TABLE 7

| Samples | Roasting conditions, temperature (° C.) × time (h) | LOI of calcined stock material (%) | Roasting conditions, temperature (° C.) × time (h) | Evaluation of abrasives | | |
|---|---|---|---|---|---|---|
| | | | | *Grindability | Scratches | *Comprehensive Evaluation |
| Comparative Example 14 | 1000 × 5 | <0.05 | 980 × 2 | 122 | 80 | C |
| Comparative Example 2 | 1000 × 2 | 0.1 | 920 × 2 | 120 | 88 | C |
| 26th Embodiment | 850 × 3 | 2.9 | 920 × 2 | 114 | 94 | B |
| 25th Embodiment | 750 × 6 | 3.0 | 920 × 2 | 114 | 98 | A |
| 24th Embodiment | 650 × 12 | 3.2 | 920 × 2 | 113 | 98 | A |
| 16th Embodiment | 500 × 12 | 5.0 | 900 × 3 | 118 | 99 | A |
| 20th Embodiment | 400 × 18 | 5.0 | 870 × 3 | 120 | 100 | A |
| 12th Embodiment | 400 × 10 | 5.0 | 920 × 2 | 111 | 95 | A |
| 13th Embodiment | 400 × 4 | 7.0 | 920 × 2 | 111 | 96 | A |
| 14th Embodiment | 400 × 2 | 9.0 | 920 × 2 | 109 | 98 | A |
| 15th Embodiment | 400 × 1 | 19.0 | 920 × 2 | 111 | 99 | A |
| Comparative Example 15 | — | 30.0 | 980 × 2 | 100 | 98 | C |

*Grindability: Refer to Table 3, 5 and 6 for the standards,
*Comprehensive evaluation
A: Grindability of 107 or more, and score of scratches: 95 or more
B: Grindability of 102 or more, score of scratches: 90 or more, and excluded from Evaluation A
C: Grindability less than 102, and score of scratches less than 90

Industrial Applicability

The method of the present invention for producing a stock material for cerium-based abrasives utilizes carbonate or oxide of rare earth. It can give the stock material for cerium-based abrasives which secures sufficient grindability and leaves behind little scratches on the ground surfaces from easily available carbonate or oxide of rare earth. The method of the present invention for producing a cerium-based abrasive from the above stock material gives the cerium-based abrasive showing the above-described excellent grinding characteristics. The cerium-based abrasive prepared by the method of the present invention can grind glass materials used in various industrial areas, including electric and electronic devices, e.g., glass as magnetic recording medium for hard disks or the like and glass substrates for liquid crystal displays.

What is claimed is:

1. A stock material for a cerium-based abrasives, wherein said stock material comprises at least one carbonate of a rare earth, and at least one rare earth oxide, wherein cerium is the most prevalent rare earth, and wherein said stock material has a loss on ignition of 0.5 to 25% on a dry basis, determined by heating at 1000° C. for one hour.

2. The stock material for cerium-based abrasives according to claim 1, wherein said loss on ignition is 5.0 to 20%.

3. The stock material for cerium-based abrasives according to claim 1, wherein said loss on ignition is 1.0 to 5.0%.

4. A method of producing a stock material for cerium-based abrasives comprising a mixture of rare earth carbonates and oxides, in which cerium is the most prevalent rare earth, and wherein said rare earth carbonates and rare earth oxides are mixed with each other in a ratio to give a loss on ignition of 0.5 to 25% on a dry basis, determined by heating at 1000° C. for one hour.

5. A method of producing a stock material for cerium-based abrasives comprising partially converting at least one carbonate of cerium into an oxide, thereby producing a partially converted carbonate; and mixing said partially converted carbonate with a mixture of rare earth oxides, in which cerium is the prevalent rare earth, to produce a mixture; and calcining said mixture under conditions of temperature and time adjusted to produce a stock material for abrasives with a loss on ignition of 0.5 to 25% on a dry basis, determined by heating at 1000° C. for one hour.

6. The method of producing a stock material for cerium-based abrasives according to claim 4, wherein said loss on ignition is 5.0 to 20%.

7. A method of producing cerium-based abrasives comprising slurrying, crushing, filtrating, drying, and roasting of the stock material according to claim 1.

8. The method of producing cerium-based abrasives according to claim 7, further comprising treatment of the stock material with a mineral acid after the slurrying but before the filtrating.

9. The method of producing cerium-based abrasives according to claim 7, further comprising fluorination of the stock material after the slurrying but before the filtrating.

10. The method of producing cerium-based abrasives according to claim 8, further comprising fluorination of the stock material before the filtration.

11. A method of producing a stock material for cerium-based abrasives comprising mixing a partially converted rare earth carbonate with a mixture of rare earth oxides, in which cerium is the prevalent rare earth, to produce a mixture of at least one rare earth carbonate and at least one rare earth oxide in which cerium is the most prevalent rare earth, wherein said at least one rare earth carbonate is calcined at 400 to 850° C. to be partly converted into the oxide.

12. The method of producing a stock material for cerium-based abrasives according to claim 11, wherein said carbonate is calcined for 0.1 to 48 hours.

13. A stock material for cerium-based abrasives, produced by the method according to claim 11.

14. A stock material for cerium-based abrasives according to claim 13, wherein said stock material has a loss on ignition of 1.0 to 20% on a dry basis, determined by heating at 1000° C. for 1 hour.

15. A method of producing cerium-based abrasives, comprising crushing and fluorinating the stock material of claim 13 to produce a fluorinated stock material, and thereafter roasting the fluorinated stock material at 700 to 1000° C.

16. The method of producing cerium-based abrasives according to claim 9, wherein said fluorination is effected with the aid of ammonium fluoride and/or hydrofluoric acid.

17. A cerium-based abrasive produced by the method according to claim 7.

18. A method of producing cerium-based abrasives comprising slurrying, filtrating, drying, and roasting of the stock material produced by the method according to claim 4.

19. The stock material for cerium-based abrasives of claim 1, wherein the rare earth oxides comprises at least 40% by weight of cerium oxide.

20. An abrasive composition, wherein said abrasive composition comprises at least one carbonate of a rare earth, and at least one rare earth oxide, wherein cerium is the most prevalent rare earth, and wherein said abrasive composition has a loss on ignition of 0.5 to 25% on a dry basis, determined by heating at 1000° C. for one hour.

21. A method of producing cerium-based abrasives comprising wet crushing, filtering, drying, and roasting of the stock material of claim 1.

22. The method of producing cerium-based abrasives according to claim 7, further comprising treating the stock material With a mineral acid after the wet crushing but before the filtrating.

23. The method of producing cerium-based abrasives according to claim 7, further comprising fluorinating the stock material after the wet crushing but before the filtrating.

24. A method of producing cerium-based abrasives comprising wet crushing, filtering, drying, and roasting of the stock material produced by claim 4.

* * * * *